United States Patent
Oishi

(10) Patent No.: US 10,771,785 B2
(45) Date of Patent: Sep. 8, 2020

(54) IMAGE ENCODING APPARATUS, METHOD OF CONTROLLING THE SAME, AND STORAGE MEDIUM

(71) Applicant: CANON KABUSHIKI KAISHA, Tokyo (JP)

(72) Inventor: Akihiro Oishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 16/205,299

(22) Filed: Nov. 30, 2018

(65) Prior Publication Data

US 2019/0182483 A1 Jun. 13, 2019

(30) Foreign Application Priority Data

Dec. 8, 2017 (JP) ................................. 2017-236294

(51) Int. Cl.
*H04N 19/00* (2014.01)
*H04N 19/124* (2014.01)
(Continued)

(52) U.S. Cl.
CPC ......... *H04N 19/124* (2014.11); *H04N 19/176* (2014.11); *H04N 19/18* (2014.11);
(Continued)

(58) Field of Classification Search
CPC ............... H04N 19/124; H04N 19/186; H04N 19/1883; H04N 19/63; H04N 19/18; H04N 19/65; H04N 19/176
See application file for complete search history.

(56) References Cited

U.S. PATENT DOCUMENTS

| | | | | |
|---|---|---|---|---|
| 2013/0293738 A1* | 11/2013 | Kulkarni | ................... | G06T 9/00 348/222.1 |
| 2014/0139642 A1* | 5/2014 | Ni | ............................ | G06T 7/90 348/48 |
| 2017/0099475 A1* | 4/2017 | Jannard | ................... | H04N 19/46 |

FOREIGN PATENT DOCUMENTS

JP 2007243515 A 9/2007

OTHER PUBLICATIONS

K. Chung and Y. Chan, "A Lossless Compression Scheme for Bayer Color Filter Array Images," in IEEE Transactions on Image Processing, vol. 17, No. 2, pp. 134-144, Feb. 2008, doi: 10.1109/TIP.2007.914153. (Year: 2008).*

* cited by examiner

*Primary Examiner* — Neil R McLean
(74) *Attorney, Agent, or Firm* — Rossi, Kimms & McDowell LLP

(57) ABSTRACT

An image encoding apparatus comprises a separation unit which separates a plurality of planes respectively configured in a single component for a frame of an inputted video; a transform unit which performs a wavelet transformation of a plane of interest in the plurality of planes; an extraction unit which, from each sub-band, extracts in order blocks representing the same region of an image; a quantizing unit which quantizes wavelet transformation coefficients; and an encoding unit which encodes the quantized wavelet transformation coefficients. Here, the quantizing unit includes a determination unit that, for each of the blocks, determines a correction parameter for correcting the quantization parameter based on a direct current value and an alternating current value of the block, and quantizes wavelet transformation coefficients in accordance with the corrected quantization parameter.

12 Claims, 9 Drawing Sheets

(51) Int. Cl.
*H04N 19/176* (2014.01)
*H04N 19/65* (2014.01)
*H04N 19/18* (2014.01)
*H04N 19/63* (2014.01)
*H04N 19/169* (2014.01)
*H04N 19/186* (2014.01)

(52) U.S. Cl.
CPC ....... *H04N 19/186* (2014.11); *H04N 19/1883* (2014.11); *H04N 19/63* (2014.11); *H04N 19/65* (2014.11)

| C00 | C01 | C02 |
|-----|-----|-----|
| C10 | C11 | C12 |
| C20 | C21 | C22 |

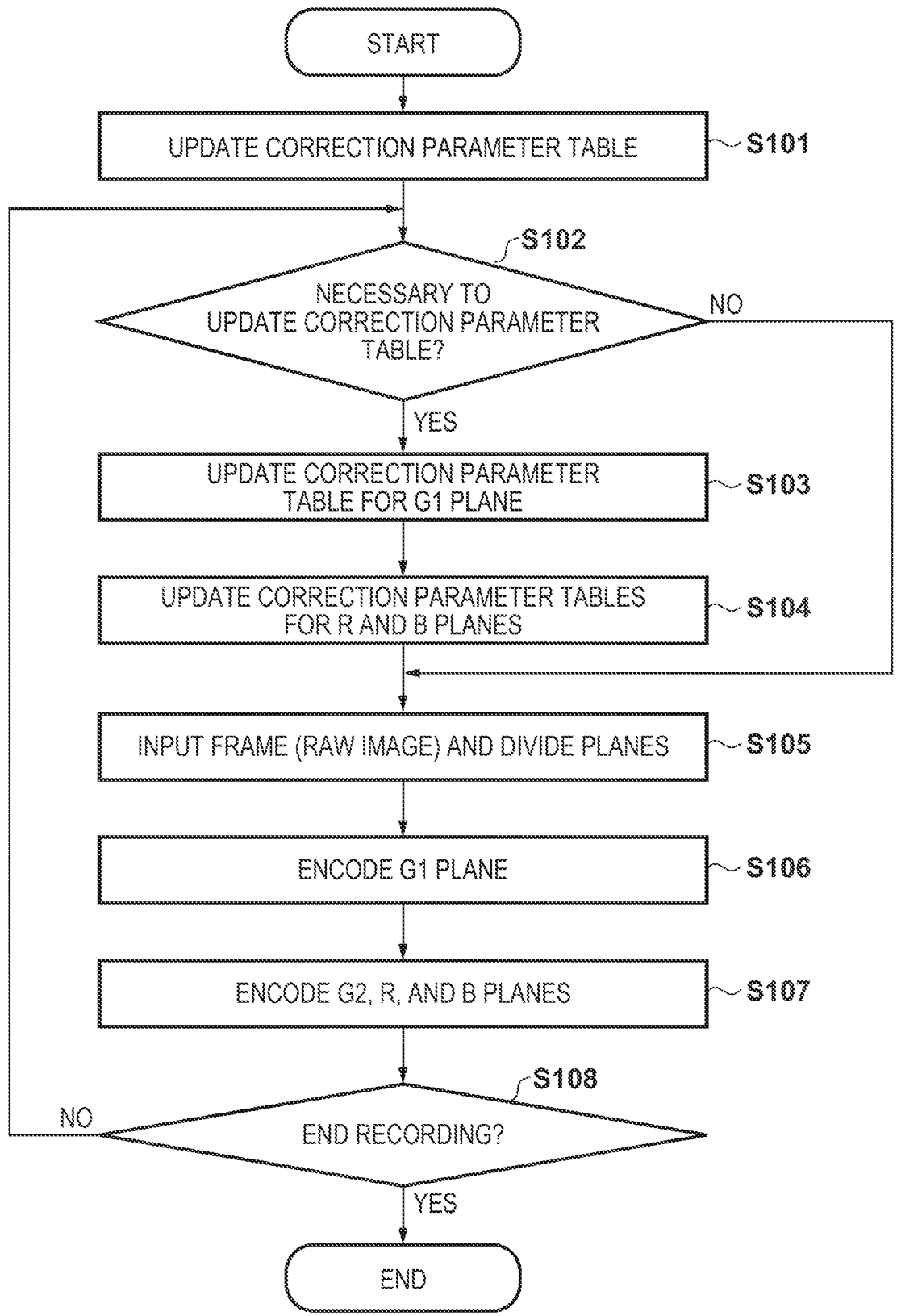

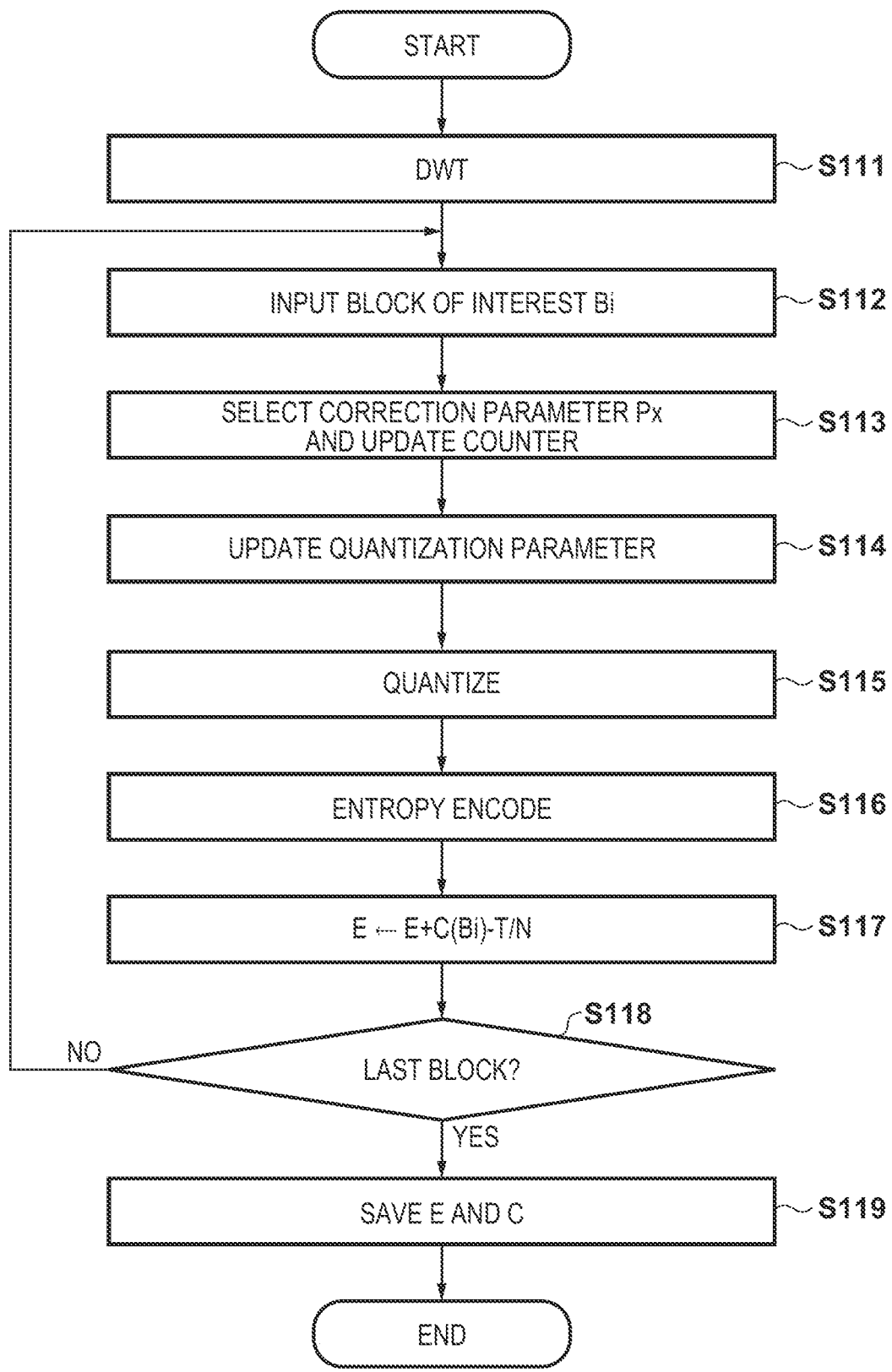

IMAGE ENCODING APPARATUS, METHOD OF CONTROLLING THE SAME, AND STORAGE MEDIUM

BACKGROUND OF THE INVENTION

Field of the Invention

The present invention relates to an encoding technique for video.

Description of the Related Art

In an image capturing apparatus as typified by a digital video camera or the like, image data (RAW image) obtained by an image sensor is DeBayer processed (alternatively called demosaicing processing), is transformed into a signal comprising one piece of luminance component data and two pieces of color difference component data, and so-called development processing such as noise elimination, optical distortion correction, and image correction is performed for each signal. It is typical for the development-processed luminance signals and color difference signals to then be compressed and encoded and recorded on a recording medium.

On the other hand, there exist apparatuses capable of recording RAW images. Although the amount of data recorded is large, the RAW images are substantially unprocessed image data prior to development processing and are a form of recorded image data used preferably by high level users because of the advantage that high level editing can be performed later.

However, it is preferred that the RAW images described above be compressed in order to be recorded onto a limited recording medium because the data amount is large. However, depending on image capturing conditions, this compression may lead to a degradation of image quality.

In Japanese Patent Laid-Open No. 2007-243515, a configuration for encoding by adaptive quantization in which a quantization coefficient is changed according to a characteristic of visual perception is described. However, in a case where the quantization coefficient is changed with a characteristic of visual perception, problems such as the correction level being weakened or the code amount becoming uncontrollable in an image with many points of correction occur.

SUMMARY OF THE INVENTION

The present invention is made in view of the corresponding problems and provides a technique for generating encoded data for which degradation of image quality is suppressed even when performing a control of a code amount to a target code amount.

According to an aspect of the invention, there is provided an image encoding apparatus for encoding a video, the apparatus comprising: a separation unit configured to separate a plurality of planes respectively configured in a single component for a frame of an inputted video; a wavelet transform unit configured to perform a wavelet transformation of a plane of interest in the plurality of planes obtained by the separation; an extraction unit configured to, from each sub-band obtained by the wavelet transform unit, extract in order blocks representing the same region of an image; a quantizing unit configured to, using a quantization parameter, quantize wavelet transformation coefficients for each of the blocks; and an encoding unit configured to encode the wavelet transformation coefficients after the quantization by the quantizing unit, wherein the quantizing unit includes a determination unit configured to, for each of the blocks, determine a correction parameter for correcting the quantization parameter based on a direct current value and an alternating current value of the block, and quantizes wavelet transformation coefficients in accordance with the quantization parameter resulting from correction by the correction parameter determined by the determination unit.

By virtue of the present invention, it becomes possible to generate encoded data for which degradation of image quality is suppressed even when performing a control of a code amount to a target code amount.

Further features of the present invention will become apparent from the following description of exemplary embodiments (with reference to the attached drawings).

BRIEF DESCRIPTION OF THE DRAWINGS

FIG. 8 is a view illustrating an example of a counter in an embodiment.

FIG. 9 is a flowchart illustrating compression encoding processing of a RAW image in an embodiment.

FIG. 10 is a flowchart illustrating details of encoding processing of a G1 plane.

DESCRIPTION OF THE EMBODIMENTS

Hereinafter, embodiments according to the present invention are described in detail in accordance with the accompanying drawings.

First Embodiment

Figure 1:
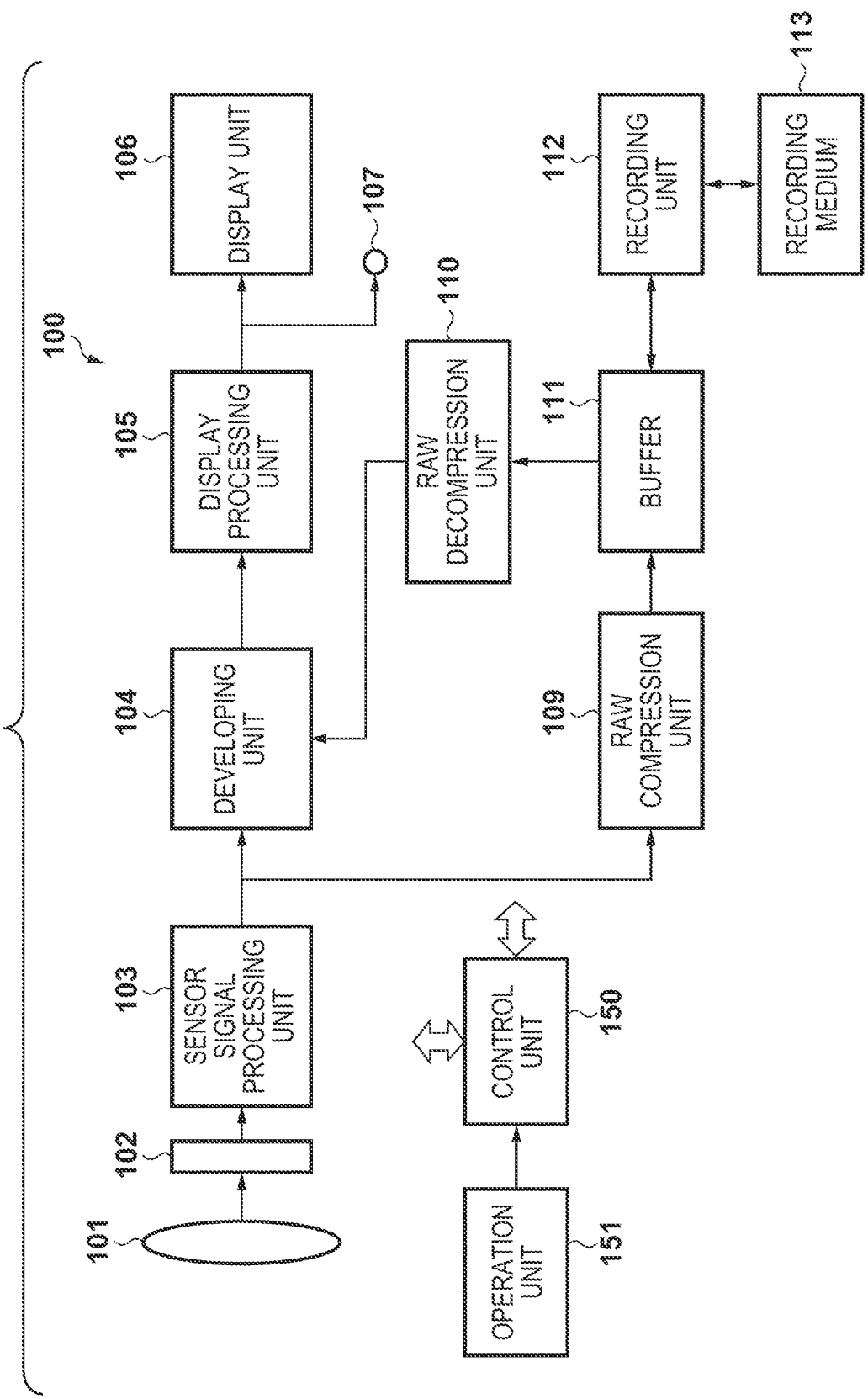
FIG. 1 is a block configuration diagram of an image capturing apparatus to which an embodiment is applied.

FIG. 1 is a block configuration diagram of an image capturing apparatus 100 that an image encoding apparatus of the first embodiment applies.

The image capturing apparatus 100 has a control unit 150 that controls the whole apparatus and an operation unit 151 that accepts instruction operations of a user. The control unit 150 is configured by a ROM that stores programs that a CPU executes and a RAM used as a work area, for example. Also, the image capturing apparatus 100 has an image capturing optical unit 101, an image sensor unit 102, a sensor signal processing unit 103, a developing unit 104, a display processing unit 105, a display unit 106, an external output terminal 107, a RAW compression unit 109, a RAW decompression unit 110, a buffer 111, and a recording unit 112.

Hereinafter, description is given of processing at a time of recording in the above configuration. This processing is performed under the control by the control unit 150 in a case where recording is instructed from the operation unit 151.

Figure 2:
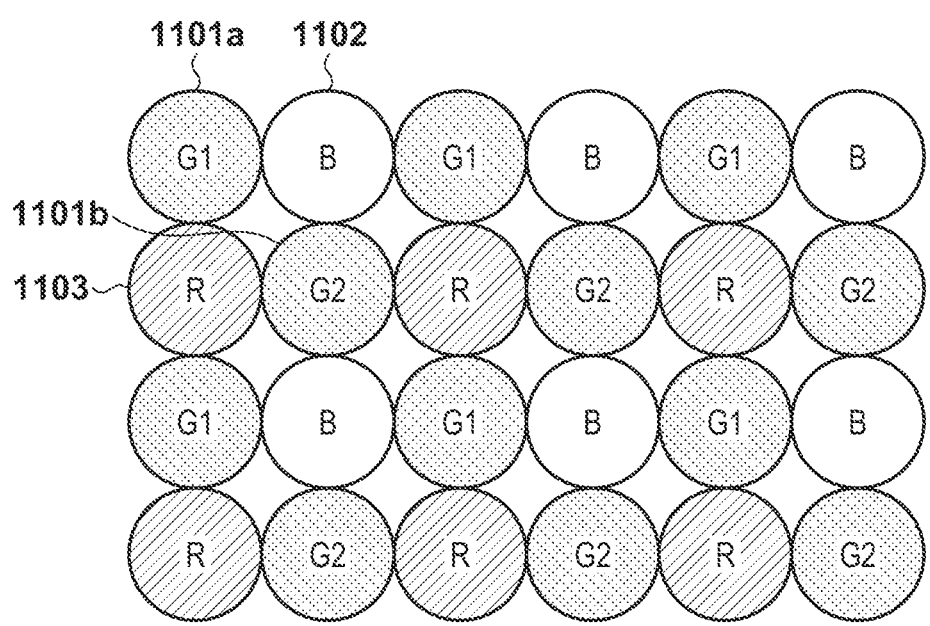
FIG. 2 is a view illustrating an example of a Bayer array.

An optical image of a subject targeted for image capture forms on the image sensor unit 102 via the image capturing optical unit 101. The image sensor unit 102 is configured by a large number of image capturing elements in a two-dimensional array on which red, green, and blue color filters are arranged on the front surface and generates an electrical signal in accordance with the intensity of light obtained by each element. Also, the image sensor unit 102 outputs the electrical signal of the image obtained by capturing at 30 frames/second. The array of color filters of the image sensor unit 102 in the embodiment is illustrated in FIG. 2. 2×2 pixels in this array are configured by two green (G1 and G2) pixels (reference numerals 1101$a$ and 1101$b$), one blue (B) pixel (reference numeral 1102), and one red (R) pixel (reference numeral 1103). Also, these 2×2 pixels are arranged in regular intervals. Such an array is generally called a Bayer array.

The electrical signal obtained by the image sensor unit 102 is transformed into digital data by the sensor signal processing unit 103 and pixel restoration processing is performed. In the restoration processing, processing for interpolating a pixel to be restored using a value of surrounding pixels and subtracting a predetermined offset value with respect to a value of missing pixels or pixels with low reliability in the image sensor unit 102 is included. In the present embodiment, image information of the Bayer array outputted from the sensor signal processing unit 103 is referred to as a RAW image or RAW image data meaning an image that is not yet developed.

The developing unit 104 performs development processing on a RAW image from the sensor signal processing unit 103 or the RAW decompression unit 110 described later. Specifically, the developing unit 104 executes DeBayer processing (demosaicing processing) on the RAW image, performs a white balance adjustment, transforms one pixel to a signal comprising one luminance component and two chrominance components, eliminates noise and corrects optical distortion included in each signal, and performs so-called development processing such as optimizing the image. Also, the developing unit 104 supplies developed image data to the display processing unit 105.

The display processing unit 105 resizes the image data from the developing unit 104 in accordance with the resolution of the display unit 106, outputs it to the display unit 106, then displays the image. The display processing unit 105 may output the development-processed image data to a display device connected externally by a video output terminal 107. The video output terminal 107 is a general purpose interface such as HDMI (registered trademark) or SDI, for example.

The RAW compression unit 109 receives the RAW image from the sensor signal processing unit 103, generates encoded data by high-efficiency encoding using a technique such as wavelet transformation or differential encoding, and stores this as encoded data of the RAW image data to the buffer 111. The recording unit 112 stores (saves) the encoded data stored in the buffer as a RAW image file to a recording medium 113. The recording medium 113 is a built-in large capacity memory or hard disk, or a recording region on an attachable/detachable type memory card or network, and the type does not particularly matter.

Hereinafter, description is given of processing at a time of playback in the above configuration. This processing is performed under control by the control unit 150 in a case where playback is instructed from the operation unit 151.

When a playback operation is started, the recording unit 112 reads the file, which is encoded data of a RAW image that the user designated, from the recording medium 113 to the buffer 111. Also, the RAW decompression unit 110 decompresses (decodes) the encoded data of the RAW image read to the buffer 111, and supplies the RAW image, which is the result thereof, to the developing unit 104. After that, similarly to during recording, the image that the RAW image obtained by decompressing represents is displayed on the display unit 106 or is displayed on a display apparatus (not shown) that is connected to the video output terminal 107.

Next, a detailed description regarding configuration and processing of the RAW compression unit 109, which is a feature in the embodiment, is given.

Figure 3:
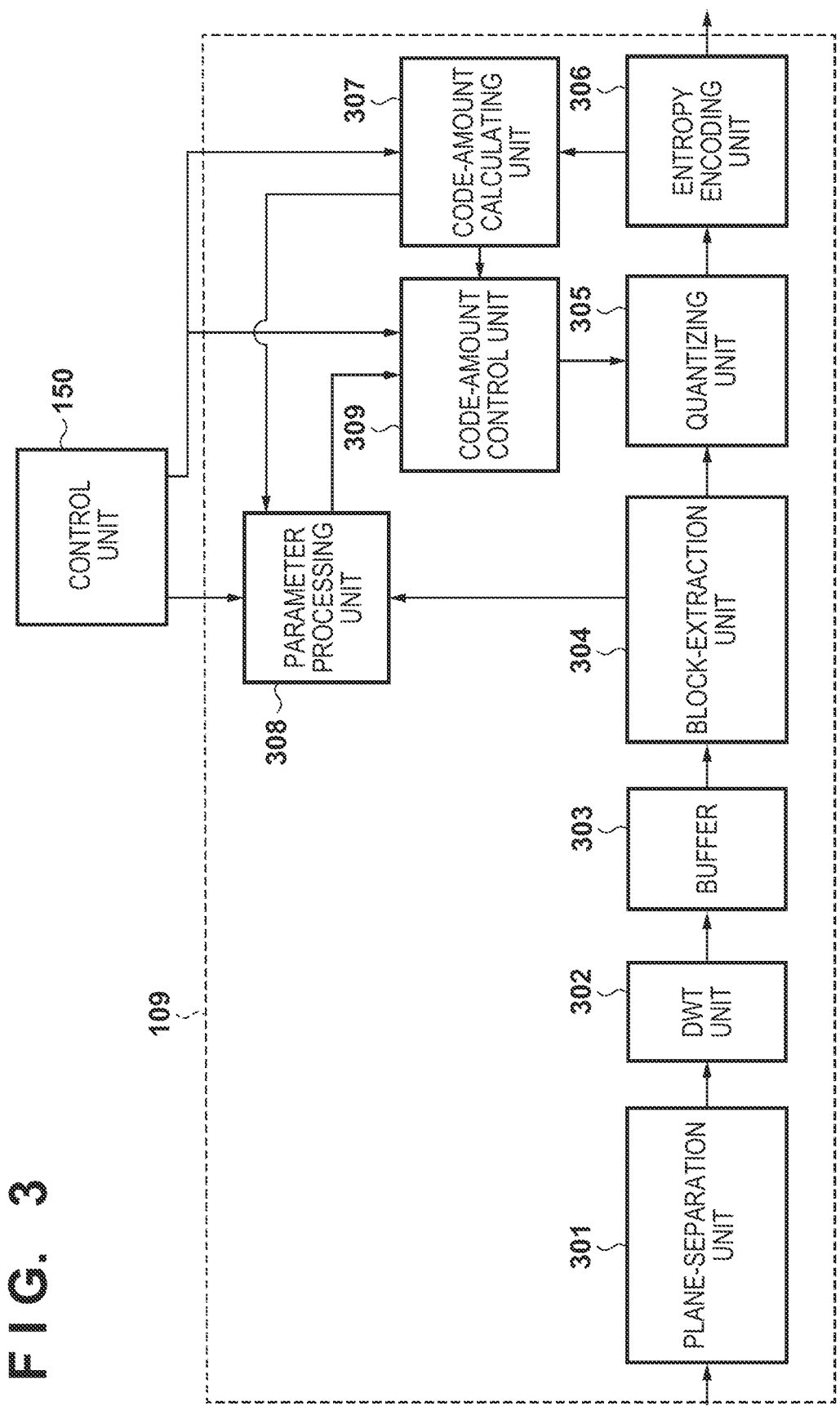
FIG. 3 is a block configuration diagram of a RAW compression unit in an embodiment.

FIG. 3 is a block configuration diagram of the RAW compression unit 109 in an embodiment. The RAW compression unit 109 includes a plane-separation unit 301, a DWT (wavelet transformation) unit 302, a buffer 303, a block-extraction unit 304, a quantizing unit 305, an entropy encoding unit 306, a code-amount calculating unit 307, a parameter processing unit 308, and a code-amount control unit 309.

Figure 4:
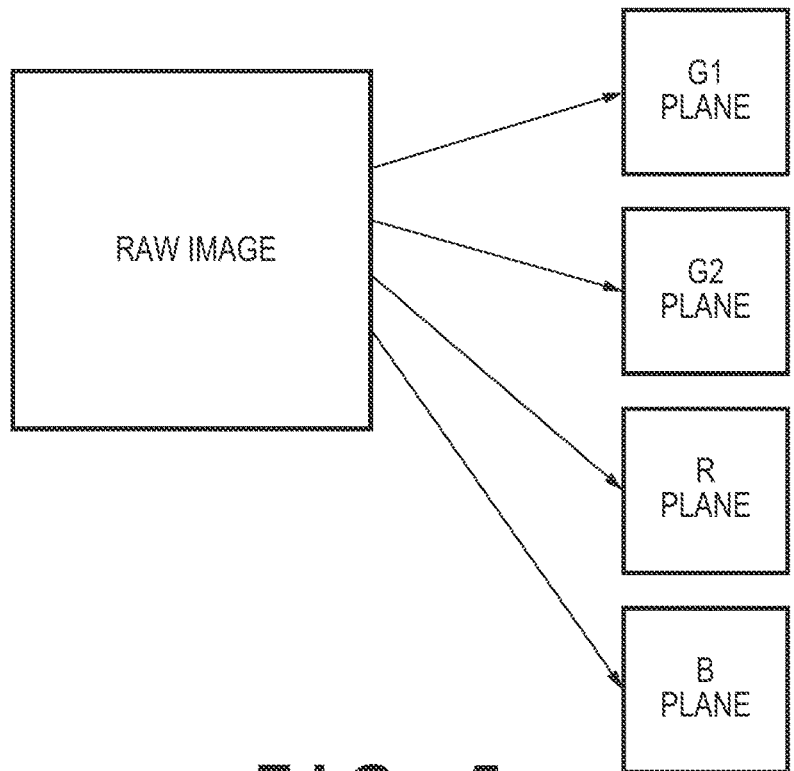
FIG. 4 is a view illustrating plane-separation processing of a plane-separation unit.

The plane-separation unit 301 receives the RAW image from the sensor signal processing unit 103 and separates the RAW image into a plurality of planes. Specifically, as illustrated in FIG. 4, the plane-separation unit 301 separates the RAW image into a G1 plane configured by only a G1 component, a G2 plane configured by only a G2 component, an R plane configured by only an R component, and a B plane configured by only a B component. When the number of pixels in the horizontal direction and the number of pixels in the vertical direction of the RAW image are made to be W and H respectively, each of these four planes are the size of W/2 horizontal pixels and H/2 vertical pixels, and it can be said that each plane represents a monochrome multi-value image with one pixel/one component. Also, the plane-separation unit 301 supplies the G1 plane, the G2 plane, the R plane, and the B plane obtained by the separation processing to the DWT unit 302 in that order. Also, the processing from this point onward is encoding processing of a single plane, in other words a monochrome multi-value image, irrespective the type of the G1 plane, the G2 plane, the R plane, and the B plane. Also, a plane targeted for encoding is referred to as a plane of interest hereinafter.

Figure 5:
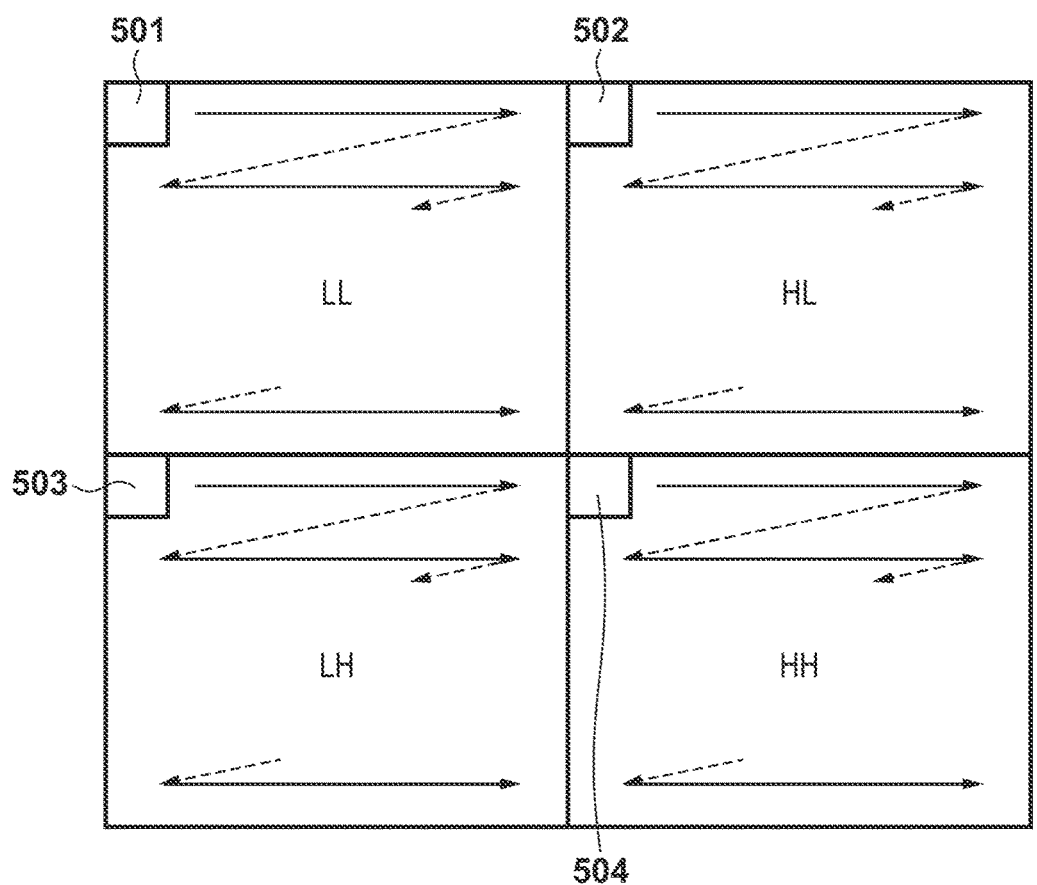
FIG. 5 is a view showing a relationship between a sub-band relationship by wavelet transformation and a block to be encoded.

The DWT unit 302 performs wavelet transformation on the plane of interest supplied from the plane-separation unit 301 (one of the G1 plane, the G2 plane, the R plane, or the B plane) as a monochrome multi-value image. Generally, although a wavelet transformation can recursively be applied to a sub-band LL obtained by a previous transformation, the wavelet transformation is described as being performed only once in order to simplify the description in the embodiment. FIG. 5 illustrates a positional relationship of sub-bands LL, HL, LH, and HH obtained by one wavelet transformation. The DWT unit 302 stores in the buffer 303 the transformation coefficients within each sub-band obtained by performing the wavelet transformation.

The block-extraction unit 304 extracts from the sub-bands LL, HL, LH, and HH stored in the buffer 303 the blocks 501 through 504 configured by transformation coefficients of a number m×n (a plurality of) which is set in advance in a raster scan order that the arrow symbols of FIG. 5 illustrate. Also, the block-extraction unit 304 supplies the extracted blocks 501 through 504 to the quantizing unit 305 and the parameter processing unit 308. Note, as will be understood if one is skilled in the art, the blocks 501 through 504 represent a set of wavelet transform coefficients of an identical area of an image targeted for encoding but the types of sub-bands that they respectively belong to differ. Also, the blocks 501 through 504 to be encoded are referred to as blocks of interest hereinafter.

The quantizing unit 305 quantizes the transformation coefficients of a block of interest supplied from the block-extraction unit 304 by using a quantization step specified by a quantization parameter Q set from the code-amount control unit 309 and supplies the result to the entropy encoding unit 306.

The entropy encoding unit 306 entropy encodes the quantization coefficients for the block of interest and outputs generated encoded data to the buffer 111 (refer to FIG. 1). Also, the entropy encoding unit 306 supplies information indicating a code amount of the encoded data obtained from block of interest to the code-amount calculating unit 307. Note, although the entropy encoding is assumed to be Golomb coding, the type of coding does not matter.

The code-amount calculating unit 307 calculates a difference between an accumulated code amount of encoded data generated until a block immediately preceding the block of interest and a target code amount for the immediately preceding block, and supplies the result to the code-amount control unit 309.

The number of blocks included in one sub-band is N. Also, the target code amount of one plane set from the control unit 150 is represented as T. As a result, the target code amount per one block can be represented as "T/N". Also, an i-th block of the plane of interest is represented as $B_i$ and the code amount of the encoded data obtained by encoding the block $B_i$ is represented as $C(B_i)$. The difference E(i) of the code amount of the code generated from the block $B_i$ and the target code amount T/N per one block can be represented as follows.

$$E(i)=C(B_i)-T/N$$

A block of interest to be encoded currently is an i-th block $B_i$. In other words, the encoding is assumed to be completed from a first block $B_i$ to an immediately preceding block $B_{i-1}$. In such a case, the code-amount calculating unit 307 calculates value "ΣE(i−1)" (accumulated code amount difference hereinafter) accumulated (total) from the first block $B_i$ difference E(1) to the immediately preceding block $B_{i-1}$ difference E(i−1), and supplies this to the code-amount control unit 309.

$$\Sigma E(i-1)=\Sigma\{C(B_k)-T/N\}$$

or $$\Sigma E(i-1)=\Sigma C(B_k)-(i-1)\times T/N$$

(Where, k=1, 2, . . . , i−1)

The parameter processing unit 308, based on the wavelet transformation coefficients of the block of interest Bi, calculates a correction parameter Px for correcting the quantization parameter for the block of interest and sets the parameter to the code-amount control unit 309 (detailed description is given later).

The code-amount control unit 309, according to the following formula, determines the quantization parameter Q of the block of interest $B_i$ and sets this to the quantizing unit 305.

$$Q=Q_{ini}+r\times\Sigma E(i-1)+Px \quad (1)$$

Here, $Q_{ini}$ is a coefficient indicating an initial quantization parameter and r is a coefficient indicating a control sensitivity, and these are set together by the control unit 150. A variation range of the quantization parameter Q increases as the sensitivity r increases, and control of the code amount becomes easy. However, because a difference in the quantization parameters between blocks tends to become large, this appears as a difference in image quality between blocks.

Here, cases in which there is no correction parameter Px of Formula (1) or in which Px=0 are considered.

Figure 6A:
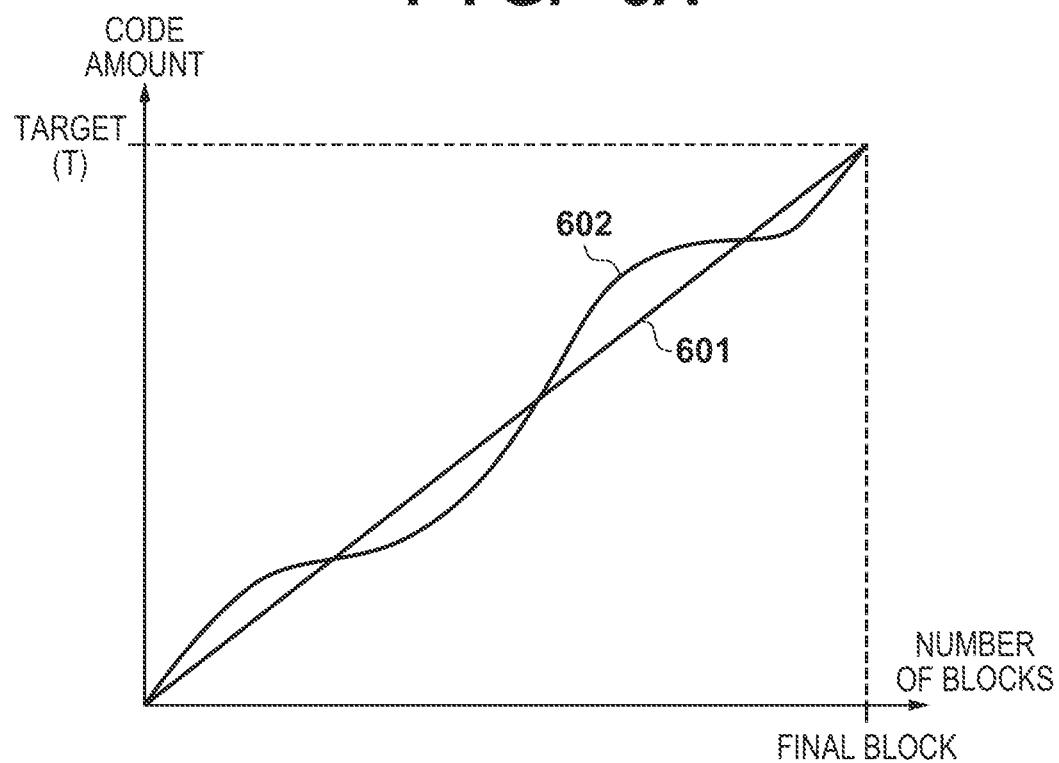
FIGS. 6A and 6B are views illustrating an example of a transition of a code amount in a case where there is no correction parameter and in a case where there is a correction parameter.

FIG. 6A is a graph illustrating a transition of a code amount in encoding processing of a plane of interest in such a case. The horizontal axis represents the number of blocks and the vertical axis represents a code amount. A straight line 601 represents y=i×T/N. The straight line 601 can also be said to be a straight line connecting the target code amount T of the plane at the position of the last block and the origin. On the other hand, a curved line 602 represents the accumulated code amount in a process of actually performing encoding processing. Specifically, it represents $y=\Sigma C(B_i)$.

As shown in the figure, in a case where the accumulated code amount at a point in time immediately prior to block $B_{i-1}$ exceeds the straight line 601, the quantization parameter Q for the block of interest $B_i$ is updated to a larger value according to Formula (1). As a result, the value of the transformation coefficients post-quantization in the block of interest $B_i$ tends to become smaller, and as a result it is possible to control the code amount for the block of interest $B_i$ to tend smaller.

Meanwhile, in a case where the accumulated code amount at a point in time immediately preceding block Bi−1 falls below the straight line 601, the quantization parameter Q for the block of interest Bi is updated to a smaller value according to Formula (1). As a result, the value of the transformation coefficient post-quantization in the block of interest Bi tends to become larger, and as a result it is possible to control the code amount for the block of interest Bi to tend to increase.

By continuing to perform the above processing up to the final block, the total code amount of the plane of interest can be controlled so as to approximate the target code amount T.

However, the code amount control processing described above focuses only on the code amount obtained by encoding for each block, and the extent of degradation of image quality is not taken into consideration. In a case where a transformation coefficient obtained by the wavelet transformation is a relatively small value, the post-quantization value becomes 0 and information that the transformation coefficient originally had is lost. In particular, there is a tendency for a wavelet transformation coefficient obtained from a dark portion within an image to generally become a small value in any sub-band. As a result, the dark portion of the image obtained by decoding is expressed with less gradations than the original number of gradations, and the image quality ends up being bad. Accordingly, in the embodiment, the quantization parameter tends to become a small value in the dark portions in the image.

As previously described, whether the block of interest $B_i$ belongs to a dark portion can be estimated from pre-quantized transformation coefficients obtained by the wavelet transformation. Accordingly, the parameter processing unit 308 in the embodiment calculates the correction parameter Px based on the blocks 501 through 504 representing the transformation coefficients of the block of interest $B_i$ obtained by the wavelet transformation. In other words, a correction parameter Px is determined such that the stronger the extent to which the block of interest $B_i$ belongs to a dark portion, the smaller the encoding parameter that the code-amount control unit 309 generates tend to become.

Specifically, the parameter processing unit 308 calculates average values $LL_{ave}$, $HL_{ave}$, $LH_{ave}$, and $HH_{ave}$ of the wavelet transformation coefficients in the blocks 501 through 504 of the block of interest $B_i$. Out of these, the maximum values of $HL_{ave}$, $LH_{ave}$, and $HH_{ave}$ are values representing a degree to which the frequency of the block of interest is high or low. Hereinafter, the value is called an AC value (or an alternating current value). Also, $LL_{ave}$ is a value representing the extent of the brightness which is a direct current component of the block of interest. Hereinafter, this value is called the DC value (a direct current value).

$$AC=\max\{HL_{ave}, LH_{ave}, HH_{ave}\}$$

$$DC=LL_{ave}$$

(Here, max{ . . . } is a function that returns a maximum value within the parentheses)

Figure 7A:
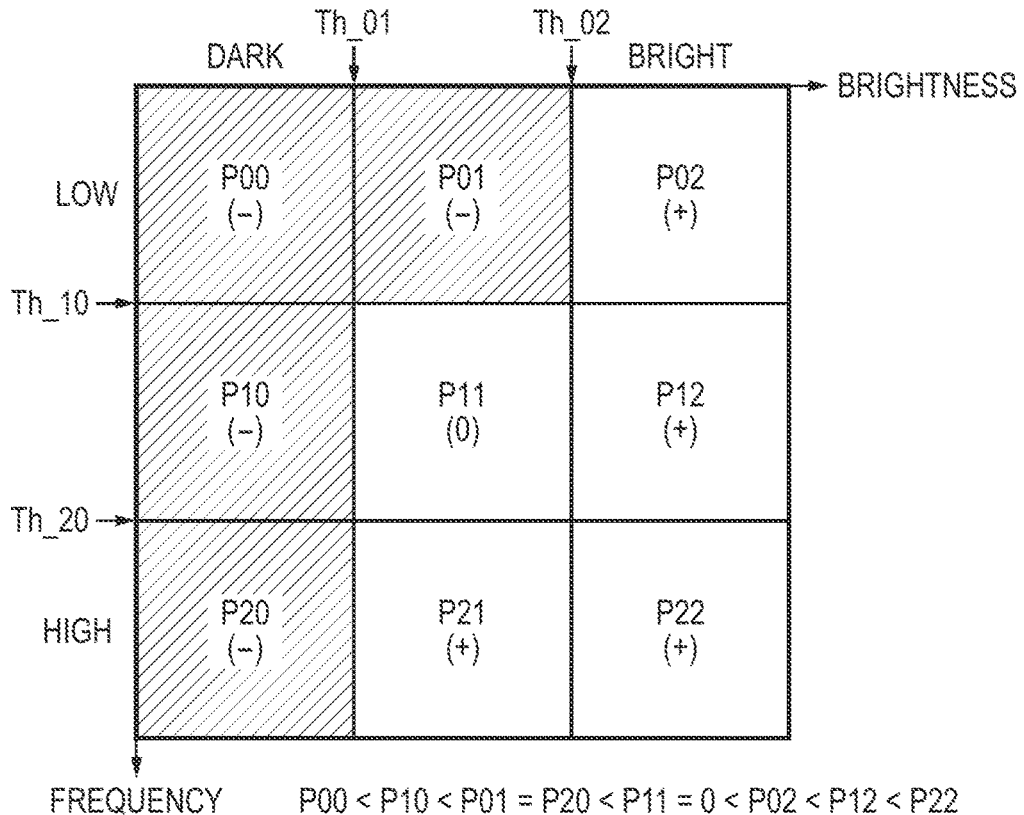
FIGS. 7A and 7B are views illustrating one example of a correction parameter table in an embodiment.

Also, as in FIG. 7A, the parameter processing unit 308 references the correction parameter table indicated by a two-dimensional coordinate space, selects one value stored in a coordinate {DC, AC} position obtained by the above processing, and supplies this to the code-amount control unit 309 as the correction parameter Px.

In the correction parameter table of FIG. 7A, the horizontally rightward direction corresponds to brightness and the vertical downward direction corresponds to frequency. In the table shown in the figure, thresholds Th_01 and Th_02 are set for the brightness axis and thresholds Th_10 and Th_20 are set for the frequency axis. Also, the coordinate space of brightness and frequency is divided into 3×3 regions by these thresholds. Symbols within the parentheses in each region represent codes indicating positive/negative for the value of the correction parameter that the region represents, and the relationship of the correction parameters for the regions is as follows.

$$P00<P10<P01=P20<P11=0<P21<P02<P12<P22$$

In other words, the darker and lower frequency it is, the more the resulting value is less than zero; and the brighter and higher frequency it is, the more the resulting value is greater than zero (positive value).

Currently, a case in which the block of interest $B_i$ belongs to a dark portion of a plane targeted for encoding is considered. In such a case, the DC value and the AC value of a block of interest will probably both be small for the reason previously described. As a result, the parameter processing unit 308 selects a negative value correction parameter from the table and sets it to the code-amount control unit 309 as the correction parameter Px. Accordingly, the quantization parameter Q used when encoding the block of interest $B_i$ is corrected to a smaller value compared to a case where there is no correction parameter Px described previously. Also, the code-amount control unit 309 sets the post-correction quantization parameter in the quantizing unit 305. As a result, it becomes possible to control such that information loss due to quantization becomes lower and so that it becomes possible to suppress the degradation of image quality of dark portions in particular.

Figure 6B:
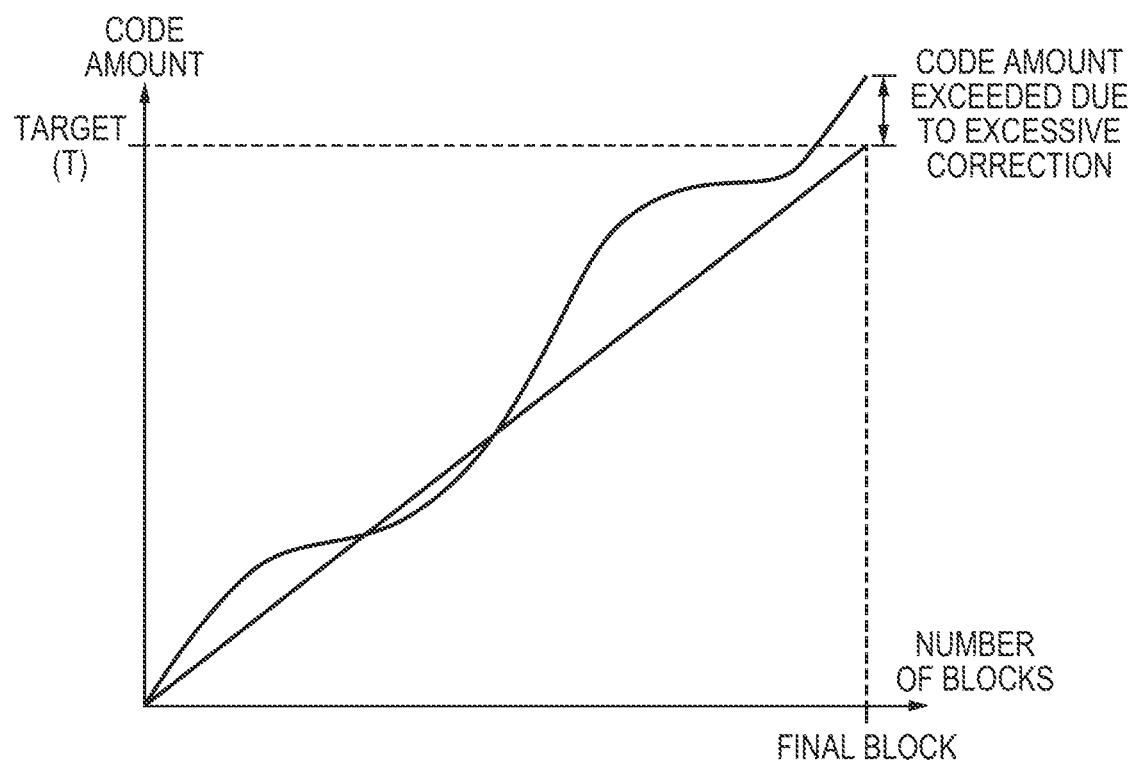

Here, attention should be given to the fact that in previously described Formula (1), the correction parameter Px which is for not only code amount control but also suppressing degradation of image quality is newly added. It is possible to cause the total code amount of the plane of interest to be approximately the target code amount T as illustrated in FIG. 6A when simply performing only code amount control. On the other hand, when dominance of image degradation suppression of the correction parameter Px which is based on the above-described DC and AC components becomes larger than necessary, as illustrated in FIG. 6B, it results in excessive correction, and there is the possibility that planes whose code amount is larger than the target code amount T will continue to be generated.

Accordingly, the parameter processing unit 308 of the embodiment determines the correction parameter Px so not to fall into such a continuous excessive correction. Hereinafter, an example in which this specific problem is solved is shown.

Figure 8:
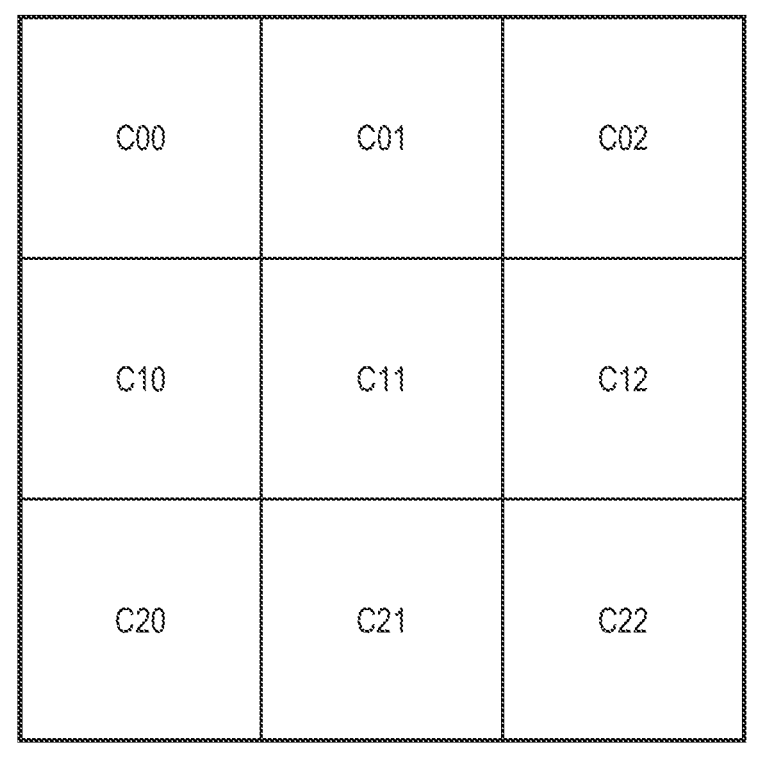

The parameter processing unit 308 has 3×3 counters C00 through C22 as illustrated in FIG. 8. The counters C00 through C22 correspond to the 3×3 correction parameters P00 through P22 in the correction parameter table illustrated in FIG. 7A. Also, in a case where a target for encoding is the G1 plane from among the four planes, the parameter processing unit 308 performs processing for incrementing the corresponding counter by "1" whenever one of the correction parameters P00 through P22 in the correction parameter table illustrated in FIG. 7A is selected. For example, the parameter processing unit 308 selects the correction parameter P00, and increases the counter C00 by "1" in a case where the correction parameter P00 is set in the code-amount control unit 309 as the correction parameter Px. As a result of the above, in a case where the encoding of the G1 plane is completed, the usage frequency of the correction parameters P00 through P22 is known from the counters C00 through C22 after the G1 plane is encoded.

Note that here, description regarding the G plane is continued and the G2 plane, the R plane, and the B plane will be described later.

As can be understood from FIG. 7A, because the negative value correction parameters are P00, P10, P01, and P20, the number of times C in which a negative value correction parameter Px is used in the encoding processing for the G1 plane is the total of the counters C00, C10, C01, and C20.

$$C=C00+C10+C01+C20$$

The parameter processing unit 308 has a predetermined storing and holding unit, and stores in the storing and holding unit a value that the above number of times C represents in a case where the encoding of the G1 plane has completed.

Also, when the encoding of the G1 plane has completed, the parameter processing unit 308 stores in the storing and holding unit a difference code amount ΣE(N) in relation to the target code amount T of the plane. The case where the difference code amount ΣE(N) is 0 indicates that the code amount of the G1 plane is the same as the target code amount T. Also, the case where the difference code amount ΣE(N) is positive indicates that the code amount of the G1 plane exceeds the target code amount T. The case where the difference code amount ΣE(N) is negative indicates that the code amount of the G1 plane is less than the target code amount T.

Here, when encoding of the initial G1 plane from among the four planes obtained from the frame of interest (RAW image) is started, the parameter processing unit 308 reads from the storing and holding unit the difference code amount ΣE(N) and the value C at a time of completion of the encoding of the G1 plane of an immediately preceding frame (called the preceding G1 plane or simply the preceding plane hereinafter).

Also, the parameter processing unit 308, based on the difference code amount ΣE(N) and the value C, determines whether or not there was excessive correction in the encoding of the preceding G1 plane, in other words, whether or not an increase in the code amount was introduced due to excessive use of negative correction parameter Px.

Specifically, the parameter processing unit 308, by using positive thresholds Th_a and Th_b which are set in advance, determines that there was excessive correction in the encoding processing of the preceding G1 plane in a case where the following condition is satisfied.

Condition: $\Sigma E(N) > \text{Th}\_a$ AND $C > \text{Th}\_b$

In a case where there was excessive correction for the preceding G plane, prior to the encoding of the G plane of interest, the parameter processing unit 308 updates the thresholds Th_01, Th_02, Th_10, and Th_20 which define the correction parameter table of FIG. 7A in accordance with the following Formula (2).

$$\text{Th}\_01 \leftarrow \text{Th}\_01 - \Delta T0$$

$$\text{Th}\_02 \leftarrow \text{Th}\_02 - \Delta T0$$

$$\text{Th}\_10 \leftarrow \text{Th}\_10 - \Delta T1$$

$$\text{Th}\_20 \leftarrow \text{Th}\_20 - \Delta T1 \quad (2)$$

Here, $\Delta T0$ and $\Delta T1$ are positive values set in advance.

Figure 7B:
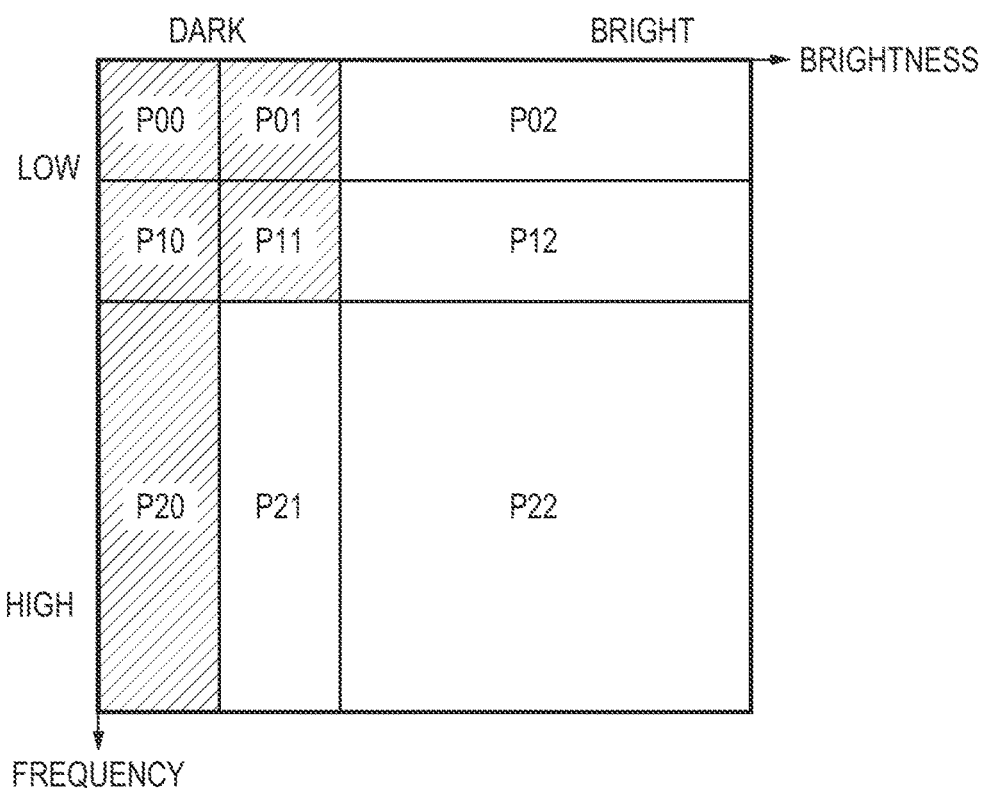

As a result of the above, the correction parameter table of FIG. 7A is updated to be the correction parameter table of FIG. 7B, and in proportion to the logical area representing a negative correction parameter becoming smaller, a negative correction parameter becomes less likely to be selected.

Also, in a case where the G1 plane of interest is to be encoded, the parameter processing unit 308, based on the wavelet transformation coefficient received from the block-extraction unit 304, calculates the AC value and the DC value, references the correction parameter table of FIG. 7B after the update, determines the correction parameter Px, and supplies it to the code-amount control unit 309.

As a result of the above, even if the code amount exceeds the target code amount T due to excessive correction in the encoding of the preceding G1 plane, it is possible to suppress the occurrence of the continuous excessive correction.

Note, in the above explanation, the thresholds for determining the correction parameter table are subtracted by $\Delta T0$ and $\Delta T1$ but as shown in the following Formulas (2'), the coefficients R0 and R1 (0<R0, R1<1) may be updated by multiplying the previous threshold.

$$\text{Th}\_01 \leftarrow \text{Th}\_01 \times R0$$

$$\text{Th}\_02 \leftarrow \text{Th}\_02 \times R0$$

$$\text{Th}\_10 \leftarrow \text{Th}\_10 \times R1$$

$$\text{Th}\_20 \leftarrow \text{Th}\_20 \times R1 \quad (2')$$

Note that in a case where the difference code amount $\Sigma E(N)$ of the preceding G1 plane is negative and the thresholds of the table of the correction parameters are smaller than the initial values, configuration is such that the thresholds are increased so as to restore the original thresholds. The increase processing may be executed in accordance with the following calculations.

$$\text{Th}\_01 \leftarrow \text{Th}\_01 + \Delta T0$$

$$\text{Th}\_02 \leftarrow \text{Th}\_02 + \Delta T0$$

$$\text{Th}\_10 \leftarrow \text{Th}\_10 + \Delta T1$$

$$\text{Th}\_20 \leftarrow \text{Th}\_20 + \Delta T1 \quad (3)$$

Although the above is in regards to the G1 plane generated from the plane of interest, the following is in regards to the correction parameters at a time of encoding processing for the G2 plane, the R plane, and the B plane.

First, although it is the G2 plane, since this G2 plane is for the same color component as the G1 plane, encoding is performed using the correction parameter table determined by the G1 plane as it is. Regarding the R plane, the threshold values of the correction parameter table for the R plane are determined by multiplying the thresholds of the correction parameter table determined when encoding the G1 plane of interest by a predetermined value. Regarding the B plane, similarly to the R plane, the thresholds of the correction parameter table for the B plane are determined by multiplying the thresholds of the correction parameter table determined when encoding the G1 plane of interest by a predetermined value.

Based on the above, encoding processing of the RAW compression unit 109 in the embodiment is described in accordance with the flowchart of FIG. 9.

Firstly, in step S101, the control unit 150, prior to recording a RAW image video, initializes (sets initial values of) the four thresholds Th_01, Th_02, Th_10, and Th_20 of the correction parameter table for the G1 plane to be used when encoding the initial frame for recording of a video. Also, the control unit 150 initializes the four thresholds of the correction parameter tables for the R plane and the B plane. Also, even though there is no frame preceding the initial frame, the difference code amount $\Sigma E(N)$ for the preceding G1 plane is set to "0" for convenience.

In step S102, the parameter processing unit 308 determines whether or not the thresholds Th_01, Th_02, Th_10, and Th_20 for the correction parameter table for the G plane should be updated. In the case where at least one of Conditions 1 and 2 indicated below are satisfied, it is determined that there should be an update.

Condition 1: there was excessive correction for the preceding G1 plane.

Condition 2: the total code amount for the preceding G1 plane is less than the target code amount T (in other words, E(N)<0), the thresholds of the correction parameter table for the G1 plane are smaller than the initial setting values.

As described previously, since, in step S102, $\Sigma E(N)=0$, and neither of Conditions 1 and 2 are satisfied. As a result, upon encoding of the initial frame, the correction parameter table for which the initial setting was performed is used, and the processing branches to step S105.

Also, in the case where either of the above Condition 1 and Condition 2 is satisfied in the process of performing encoding of a frame after the first frame, the parameter processing unit 308, in step S103, updates the thresholds of the correction parameter table for the G plane.

Specifically, in the case where Condition 1 is satisfied, the parameter processing unit 308, in accordance with Formula (1) described previously, updates the threshold Th_01, Th_02, Th_10, and Th_20 of the correction parameter table for the G1 plane.

Also, in the case where Condition 2 is satisfied, the parameter processing unit 308, in accordance with Formula (2) described previously, updates the threshold Th_01, Th_02, Th_10, and Th_20 of the correction parameter table for the G1 plane.

When the processing for updating the thresholds of the correction parameter table for the G1 plane is finished, the parameter processing unit 308 advances the processing to step S104. In step S104, based on the thresholds of the correction parameter table for the G1 plane after update, the threshold of the correction parameter tables for the R plane and the B plane are determined using a function or a table that is set in advance. Note that, as described previously, when the G2 plane is encoded, update processing is unnecessary since the correction parameter table for the G1 plane is used as is.

In step S105, the plane-separation unit 301 inputs the RAW image data which is the frame of interest from the sensor signal processing unit 103, generates four planes—the G1 plane, the G2 plane, the R plane, and the B plane—from the RAW image data, and supplies them in that order to the DWT unit 302. The result of this is that the encoding processing for the G1 plane in step S106 and the encoding processing for the G2 plane, the R plane, and the B plane in step S107 are performed.

Then, in step S108, the control unit 150 determines whether or not an instruction to end recording of the video is received via the operation unit 151 from the user. In the case where there is an end instruction, the control unit 150 ends the encoding processing by the RAW compression unit 109. Also, in the case where there is no end instruction, the control unit 150 returns the processing to step S102, and continues the encoding processing of the next frame.

Here, description of the encoding processing for the G1 plane in step S106 is given in accordance with the flowchart of FIG. 10.

In step S11, the DWT unit 302 receives the G1 plane supplied from the plane-separation unit 301, and executes a wavelet transformation. Then, the DWT unit 302 stores in the buffer 303 the wavelet transformation coefficients for each sub-band obtained by the wavelet transformation.

In step S112, the block-extraction unit 304 extracts from the buffer 303 the block of interest $B_i$ (501 to 504 in FIG. 5) that is the target of encoding, and supplies it to the parameter processing unit 308 and the quantizing unit 305.

In step S113, the parameter processing unit 308 calculates the DC value and the AC value for the block of interest $B_i$ supplied by the block-extraction unit 304. Then, the parameter processing unit 308, based on the calculated DC value and AC value, selects one of the correction parameters P00 through P22 in the correction parameter table (refer to FIGS. 7A and 7B), and supplies that to the code-amount control unit 309 as the correction parameter Px. At that time, the parameter processing unit 308 increases the corresponding one in the counters C00 through C22 indicated in FIG. 8 by "1".

In step S114, the code-amount control unit 309, based on the correction parameter Px from the parameter processing unit 308 and the difference code amount $\Sigma E(i-1)$ from the code-amount calculating unit 307 to the block immediately preceding the block of interest $B_i$, determines the quantization parameter Q for the block of interest $B_i$ (refer to Formula (1)). Then, the code-amount control unit 309 sets determined quantization parameter Q in the quantizing unit 305.

In step S115, the quantizing unit 305 quantizes the wavelet transformation coefficients for the block of interest $B_i$ supplied from the block-extraction unit 304. Then, the quantizing unit 305 supplies to the entropy encoding unit 306 the wavelet transformation coefficients after quantization.

In step S116, the entropy encoding unit 306 encodes the transformation coefficients after quantization from the quantizing unit 305, generates encoded data, and outputs it to the buffer 111. At that time, the entropy encoding unit 306 supplies to the code-amount calculating unit 307 the code amount $C(B_i)$ for the block of interest $B_i$.

In step S117, the code-amount calculating unit 307 receives the code amount $C(B_i)$ from the code-amount calculating unit 307, and updates the difference code amount $\Sigma E(i)$ from the first block to the block of interest $B_i$ for the G1 plane of interest.

Then, the control unit 150, in step S118, determines whether or not the block of interest $B_i$ is the last block in the G1 plane of interest. In the case where the block of interest is not the last block, the control unit 150 returns the processing to step S112 in order to encode the next block. On the other hand, in the case where the block of interest is the last block, the control unit 150, in relation to the code-amount control unit 309, saves in the storage unit the plane of interest difference code amount E(N) and the value C representing the number of times a negative correction parameter was selected, and finishes this processing.

The above is the encoding processing for the G1 plane. The encoding for the G2 plane, the R plane, and the B plane are basically the same as FIG. 9 and so description thereof is omitted.

As described above, by virtue of the present embodiment, even if while suppressing degradation of gradation properties of dark areas in an image, the target code amount for a frame is locally exceeded, it becomes possible to cause the average code amount per frame to approximate the target code amount.

Note that in the foregoing embodiment, it was assumed that it is determined whether or not to perform an update of the thresholds for the correction parameter table for the G1 plane, and the determination for the G1 plane is followed for the R and B planes. However, while the G2 plane may be the same as the G1 plane, the R and B planes may also be determined to be the same as the G1 plane.

Also, the correction parameter table in the foregoing embodiment was assumed to be of a configuration in which there are 3×3 regions where both the axial direction representing the direct current value and the axial direction representing the frequency are divided into three. However, there is no limitation to this number, and generally, it is possible to use a table having n×m correction parameters.

Note that in the foregoing embodiment, the wavelet transformation was described as something that is performed one time, but the number of times the wavelet transformation is performed does not particularly matter. For example, the wavelet transformation is assumed to be performed n times, for example. In such a case, the size of the block in the sub-band obtained by the n-th wavelet transformation is a size that is $\frac{1}{2}^{n-1}$ both horizontally and vertically with respect to the first time. For the DC value, the transformation coefficients in the n-th sub-band LL may be obtained from the average value. Also, for the AC value, the sum of the sub-bands at each stage for which an appropriate weighting coefficient α is multiplied with the maximum value of the average value of HL, LH, and HH may be obtained.

Specifically, the average value of the transformation coefficients for the sub-bands HL, LH, and HH obtained in the j-th wavelet transformation are expressed as $HL_{ave}(j)$, $LH_{ave}(j)$, and $HH_{ave}(j)$, and when the multiplier coefficient for the j-th time is made to be $\alpha_j$, the AC value for the block of interest $B_i$ is represented as in the following formula.

$$AC = \alpha_n \times \max\{HL_{ave}(n), LH_{ave}(n), HH_{ave}(n)\} + \alpha_{n-1} \times \max\{HL_{ave}(n-1), LH_{ave}(n-1), HH_{ave}(n-1)\} + \ldots + \alpha_1 \times \max\{HL_{ave}(1), LH_{ave}(1), HH_{ave}(1)\}$$

Also, in the case where wavelet transformations are performed n times, the parameter processing unit 308 may select the correction parameter based on the DC value and the AC value calculated as described above.

Second Embodiment

In above-described first embodiment, it was described that G1, G2, R, and B planes are separated from the RAW image, and each is encoded. Since it is sufficient that the RAW image can be reconfigured from the encoded data, there is no limitation to the above-described four planes.

For example, the plane-separation unit 301 may, in accordance with the following Formula (4), calculate one brightness component Y and three chrominance components C1, C2, C3.

$$Y=(R+B+G1+G2)/4$$

$$C1=R-G1$$

$$C2=B-G2$$

$$C3=(R+G1)/2-(B+G2)/2 \quad (4)$$

Also, the plane-separation unit 301 may generate a Y plane, a C1 plane, a C2 plane, and a C3 plane which are configured as a single component. In such a case, a determination as to whether or not to perform processing to update the correction parameter table for the Y plane which represents brightness may be performed, and the C1, C2, and C3 color difference planes may be updated so as to follow the brightness Y plane. The RAW decompression unit 110 may back calculate G1, G2, R, and B values from the Y, C1, C2, and C3 planes which are the decoding results of the encoded data, and generate a RAW image in a Bayer array.

Third Embodiment

In the first embodiment, in the case where there is excessive correction in the encoding processing for the preceding G1 plane, configuration is such that by making the thresholds of the correction parameter table smaller, negative correction parameter selection in the encoding processing for the G1 plane of interest tends not to happen. However, the possibility that excessive correction will occur across a plurality of frames cannot be denied. When excessive correction occurs continuously, frames that exceed the target code amount T continue, and it means that there will be the possibility that an upper limit on the code amount that can be tolerated will be exceeded.

Accordingly, in the third embodiment, description is given of an example in which in the case where the number of frames over which excessive correction continues is M0, for example, from there on the thresholds Th_01, Th_02, Th_10, and Th_20 of the correction parameter table are not updated, and the correction parameters P00 through P22 for the correction parameter table themselves are corrected.

As illustrated in FIG. 7A, the relationship between the correction parameters P00 through P22 in the initial value settings is the relationship indicated below.

$$P00<P10<P01=P20<P11=0<P21<P02<P12<P22$$

In the case where excessive correction occurs and the number of times it continues is less than M0 times, processing according to the first embodiment is performed. Then, in the case where excessive correction is continued for M0 times, the control unit 150, in relation to the parameter processing unit 308, performs the following setting.

$$P00<P10<P01=P20=0<P11<P21<P02<P12<P22$$

Then, in the case where excessive correction is continued for another M1 times, the control unit 150, in relation to the parameter processing unit 308, performs the following setting.

$$P00<P10=0<P01=P20<P11<P21<P02<P12<P22$$

In other words, the more that the number of times that excessive correction increases, the more the number of positive correction parameters increases from bright and high-frequency towards dark and low-frequency. In other words, the more that the number of times that excessive correction increases, the more the number of negative correction parameters is reduced from dark and low-frequency towards bright and high-frequency.

Also, in the case where the difference code amount ΣE(N) for the preceding G1 plane is negative (less than the target code amount T), the control unit 150 performs processing to return to the initial relationship:

$$P00<P10<P01=P20<P11=0<P21<P02<P12<P22.$$

The result of the above is that by virtue of the third embodiment, it is possible to suppress an increase in the code amount caused by excessive correction. Note that the third embodiment is premised upon the first embodiment, but it may also be applied to the second embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-236294, filed Dec. 8, 2017, which is hereby incorporated by reference herein in its entirety.

What is claimed is:

1. An image encoding apparatus for encoding a video, the apparatus comprising:
   at least one memory storing instructions; and
   at least one processor that implements the instructions to execute a plurality of tasks, including:
   a separation task that separates a plurality of planes respectively configured in a single component for a frame of an input video;
   a wavelet transform task that performs a wavelet transformation of a plane of interest in the plurality of planes obtained by the separation task;
   an extraction task that, from each sub-band obtained by the wavelet transform task, extracts in order blocks representing the same region of an image;
   a quantizing task that, using a quantization parameter, quantizes wavelet transformation coefficients for each of the blocks; and
   an encoding tasks that encodes the wavelet transformation coefficients after the quantization by the quantizing task, wherein
   the quantizing task:
   determines, for each of the blocks, a correction parameter for correcting the quantization parameter based on a direct current value and an alternating current value of the block; and
   quantizes the wavelet transformation coefficients in accordance with the quantization parameter resulting from correction by the determined correction.

2. The apparatus according to claim 1, wherein the quantizing task:
   selects, as the correction parameter to be used for correcting the quantization parameter for the block of interest, a correction parameter corresponding to a direct current value and an alternating current value of a block of interest that is a target of quantization from among a plurality of correction parameter; and
   changes, in accordance with a state of a number of times that each correction parameter in the plurality of correction parameters was selected, an association relationship between a direct current value and an alternating current value and the plurality of correction parameters.

3. The apparatus according to claim 2, wherein the quantizing task corrects, by the determined correction parameter, the quantization parameter determined in accordance with a code amount of the encoded data generated prior to the block of interest, and quantizes wavelet transformation coefficients in the block of interest in accordance with the quantization parameter resulting from the correction.

4. The apparatus according to claim 3, wherein:
   when a code amount of the encoded data of an i-th block $B_i$ is represented by $C(B_i)$:
   a target code amount for the plane of interest is represented by T, a number of block included in the plane of interest is represented by N,
   and the block of interest is the i-th block $B_i$, and the correction parameter, which is determined based on a direct current value and an alternating current value of the block of interest $B_i$, is represented by Px,
   the quantizing task determines a quantization parameter Q for the block of interest $B_i$ as:

$Q = Q_{ini} + r \times \Sigma \{C(B_k) - T/N\} + Px$ wherein $\Sigma$ represents a total of $k=1, 2, \ldots, i-1$, $Q_{ini}$ indicates an initial quantization parameter, and r indicates a coefficient representing a sensitivity set in advance.

5. The apparatus according to claim 4, wherein
   the quantizing task
   obtains average values $LL_{ave}$, $HL_{ave}$, $LH_{ave}$, and $HH_{ave}$ of wavelet transform coefficients of the block of interest in sub-bands LL, HL, LH, and HH, and determines in accordance with the following formulas a DC value indicating a direct current value and an AC value indicating an alternating current value for the block of interest:

$DC = LL_{ave}$; and $AC = \max\{HL_{ave}, LH_{ave}, HH_{ave}\}$, where max { ... } is a function that returns a maximum value within the parentheses, and
   one value among the plurality of values assigned to a two-dimensional coordinate space for direct current values and alternating current values set in advance is selected as Px, which is the correction parameter, based on coordinates that the DC value and the AC value represent.

6. The apparatus according to claim 5, wherein:
   the two-dimensional coordinate space is configured by n×m regions divided in accordance with a number of thresholds that is set in advance and following axial directions for direct current values and alternating current values, and
   values assigned to the n×m regions are smaller than zero for smaller direct current values and smaller alternating current values, and larger than zero for larger direct current values and larger alternating current values.

7. The apparatus according to claim 6, wherein the plurality of tasks include:
   a judgement task that, when a plane of a same component as the plane of interest in a frame immediately preceding a frame that the plane of interest belongs to is assumed to be a preceding plane, determines whether or not in the preceding plane there was excessive correction, which represents when the number of times that a negative value is selected for the correction parameter exceeds a number of times set in advance, and a code amount of encoded data exceeds a target code amount; and
   a correction task that, in a case where the judgement task determines that there was the excessive correction in encoding of the preceding plane, corrects a threshold for determining the n×m regions to be a smaller value.

8. The apparatus according to claim 7, wherein the separation task, from an image of a Bayer array frame, separates a G1 plane, a G2 plane, an R plane, and a B plane, which are respective components of 2×2 pixels in the Bayer array.

9. The apparatus according to claim 7, wherein the separation task, from G1, G2, R, and B values that 2×2 pixels in an image of a Bayer array frame represent, calculates one brightness component Y and three chrominance components C1, C2, and C3 in accordance with the following formulas, and thereby generates a Y plane, a C1 plane, a C2 plane, and a C3 plane:

$Y = (R+B+G1+G2)/4$;

$C1 = R-G1$;

$C2 = B-G2$; and $C3 = (R+G1)/2 - (B+G2)/2$.

10. The apparatus according to claim 7, wherein the plurality of tasks include a processing task that, in a case where a correction of the correction task is continuously performed over a number of frames set in advance, reduce the number of regions having a negative value out of the values assigned to the n×m regions.

11. A method of controlling an image encoding apparatus for encoding a video, the method comprising:
- separating a plurality of planes respectively configured in a single component for a frame of an input video;
- performing a wavelet transformation of a plane of interest in the plurality of planes obtained by the separation;
- from each sub-band obtained in the wavelet transformation, extracting in order blocks representing the same region of an image;
- using a quantization parameter, quantizing wavelet transformation coefficients for each of the blocks; and
- encoding the wavelet transformation coefficients after the quantizing,
- wherein the quantizing:
- determines, for each of the blocks, a correction parameter for correcting the quantization parameter based on a direct current value and an alternating current value of the block; and
- quantizes the wavelet transformation coefficients in accordance with the quantization parameter resulting from correction by the determined correction parameter.

12. A non-transitory computer-readable storage medium storing a program executable by a computer to perform a method of controlling an image encoding apparatus for encoding a video, the method comprising:
- separating a plurality of planes respectively configured in a single component for a frame of an input video;
- performing a wavelet transformation of a plane of interest in the plurality of planes obtained by the separation;
- from each sub-band obtained in the wavelet transformation, extracting in order blocks representing the same region of an image;
- using a quantization parameter, quantizing wavelet transformation coefficients for each of the blocks; and
- encoding the wavelet transformation coefficients after the quantizing,
- wherein quantizing,
- determines, for each of the blocks, a correction parameter for correcting the quantization parameter is determined based on a direct current value and an alternating current value of the block; and
- quantizes the wavelet transformation coefficients in accordance with the quantization parameter resulting from correction by the determined correction parameter.

* * * * *